(12) United States Patent
Kennedy et al.

(10) Patent No.: US 10,029,384 B2
(45) Date of Patent: Jul. 24, 2018

(54) LUMBER EDGER AND METHOD OF EDGING LUMBER

(71) Applicant: Baxley Equipment Co., Hot Springs, AR (US)

(72) Inventors: Russell R. Kennedy, Hot Springs, AR (US); Patrick M. Conry, Hot Springs, AR (US); Chris Raybon, Hot Springs, AR (US); David A. Carty, Hot Springs, AR (US)

(73) Assignee: BAXLEY EQUIPMENT CO., Hot Springs, AR (US)

( * ) Notice: Subject to any disclaimer, the term of this patent is extended or adjusted under 35 U.S.C. 154(b) by 648 days.

(21) Appl. No.: 14/597,493

(22) Filed: Jan. 15, 2015

(65) Prior Publication Data

US 2015/0197031 A1 Jul. 16, 2015

Related U.S. Application Data

(60) Provisional application No. 61/927,707, filed on Jan. 15, 2014.

(51) Int. Cl.
*B27B 5/04* (2006.01)
*B23D 59/00* (2006.01)
*B27B 31/06* (2006.01)

(52) U.S. Cl.
CPC .............. *B27B 5/04* (2013.01); *B23D 59/001* (2013.01); *B23D 59/008* (2013.01); *B27B 31/06* (2013.01)

(58) Field of Classification Search
CPC ........... B27B 1/00; B27B 1/002; B27B 1/005; B27B 1/007; B27M 1/00; B27M 1/08; Y10T 83/051; Y10T 83/527; Y10T 83/536
See application file for complete search history.

(56) References Cited

U.S. PATENT DOCUMENTS

| | | | |
|---|---|---|---|
| 4,462,443 A | 7/1984 | Allen | |
| 4,676,130 A | 6/1987 | Nutt | |
| 4,803,371 A | 2/1989 | Durland | |
| 5,605,216 A * | 2/1997 | Raybon | .................. B27B 31/04 144/357 |
| 6,240,821 B1 * | 6/2001 | Landers | ............... B23D 47/042 83/356 |
| 6,308,756 B1 | 10/2001 | Anttilla | |
| 2005/0150743 A1 * | 7/2005 | Henderson | ........... B65G 47/248 198/403 |
| 2013/0269836 A1 | 10/2013 | Wilkins | |

* cited by examiner

*Primary Examiner* — Matthew G Katcoff
(74) *Attorney, Agent, or Firm* — Jeffrey S. Melcher; Manelli Selter PLLC

(57) ABSTRACT

A lumber edger and method of edging lumber using a positioning system having a plurality fetcher fingers driven by a non-hydraulic drive.

6 Claims, 7 Drawing Sheets

LUMBER EDGER AND METHOD OF EDGING LUMBER

This application claims priority to U.S. provisional patent application No. 61/927,707, filed 15 Jan. 2015, the complete disclosure of which is incorporated herein by reference.

FIELD OF THE INVENTION

The invention relates to an improved lumber edger positioning system and method of edging lumber, providing higher positioning speeds and using electric servo drives to take the place of conventional hydraulic positioning systems.

BACKGROUND OF THE INVENTION

Lumber edgers saw off the rough side edges of freshly sawn lumber (planks), also referred to as flitches, to produce 4 sided boards using edger saws. The edger saws are parallel to each other and typically about 4", 6", 8", 10" or 12" apart. The flitch is scanned prior to cutting to determine what the widest and longest single board or set of side by side boards that can be manufactured, then laterally positions and skews the flitch to suit that cut solution and releases it to be conveyed linearly through the edger saws.

Lumber edgers can be categorized as gang or shifting edgers. In gang edgers the edger saws remain stationary. In a shifting edger the edger saws can move left or right independently of one another. This allows setting the saws to best maximize the product that can be produced from a particular position of the lumber. In this usage, position means the side to side translation of the board relative to a pair or bank of saws such that as the board is propelled through the saws a particular path is sawn. Additionally, position includes the rotation of the board or skew relative to the same pair or bank of saws. Combining the translation and skew forms the position of the flitch.

Modern lumber edgers usually include a lumber sensor that measures the dimensions of the lumber (flitch). The lumber is then positioned in relation to the edger saws to maximize the amount of board that can be produced by cutting the edges. Present day positioning systems consist of multiple positioning assemblies called fetchers. Two positioners will be used on each board, a near-end positioner and a far-end positioner. By setting at differing positions around the centerline feed of the edger feed table, they can "skew" the piece laterally in relation to the saws. These fetchers are most often powered by hydraulic cylinders, with servo/proportional valves for accurate sets and temposonics style probes for positioning feedback to the controls system.

Hydraulic systems are not as desirable in a sawmill setting as they once were. Fire, EPA reguations, over-heating, high horsepower requirements, maintenance problems and constant leaks are just a few of the problems relating to these systems.

A lumber edger is described in my previous published U.S. patent application No. 2013/0269836, filed 11 Apr. 2013, which is incorporated herein by reference.

SUMMARY OF THE INVENTION

It has now been found that the problems associated with hydraulic systems can be overcome by using servo drives and servo motors.

The improved positioning device can be mounted on a rail with linear bearings and driven in and out (from the edger feed table or conveyor) with a cogged belt (or chain, or other). A rotating fetcher finger can be located on each device that would rotate up depending on which fetcher was to be used. The servo motor can drive the device in and out and encoders (on the back of the servo drive and on the cogged belt sheave) would feed back the position to the control system.

Other advantages of the present invention include that the friction disk hub can slip if servo positioner lost position and ran the fetcher finger assembly to the end of the stroke preventing cogged belt from breaking. A rubber bumper can be mounted on each end of the rail to ensure that servo motor did not drive the assembly too far and break the cogged belt. A photocell or magnetic pickup indicator can be located on each ServoFetcher assembly. This could be used for "auto-calibration" when the fetcher device passed the indicator. An air-cylinder holdback (present technology as well) can be located on the far side of the feed table to "hold" the flitch between the positioning pin and the holdback. Without this holdback, the flitch can continue to slide forward as the ServoFetchers slowed to position.

Edger systems use multiple positioning devices on the feed table or conveyor. Device #1 located at the even-end side can be always used. The other far-end devices are picked to be used (only one other) depending on the length of the board. The far-end devices could be driven with one servo motor and a shaft connecting them as the rotating positioning finger would only raise on the device that needed to position the flitch. Individual drives on each positioner could be used as well.

The improved positioning device can be retrofitted on existing edger systems with conventional fetcher designs.

The objectives of the invention can be obtained by a lumber edger comprising:
  a conveyor for conveying lumber;
  a scanner for scanning dimensions of the lumber;
  a computer in communication with the scanner;
  edger saws constructed to edge the lumber; and
  a positioning system to position the lumber in relation to the edger saws, the positioning system comprising a plurality of positioning devices connected to the computer, each positioning device comprising a fetcher finger constructed to rotate between a contact position and a non-contact position, and move laterally in a direction substantially perpendicular to the conveyor using a non-hydraulic means, wherein the positioning system is constructed to skew the lumber on the conveyor.

The objectives of the invention can also be obtained by a method of edge cutting lumber comprising:
  conveying a piece of lumber on a conveyor;
  scanning dimensions of the lumber using a scanner and sending the dimensions to a computer system;
  using the computer system to determine theoretical edge cut positions on the lumber;
  using a positioning system to position the piece of lumber in relation to edger saws so that the edge saws cut the pieces of lumber at the theoretical edge cut positions, wherein the positioning system comprising a plurality of positioning devices connected to the computer, each positioning device comprising a fetcher finger constructed to rotate between a contact position and a non-contact position, and move laterally in a direction substantially perpendicular to the conveyor using a non-hydraulic means, wherein the positioning system is constructed to skew the lumber on the conveyor; and
  cutting the lumber using the edger saws at the theoretical edge cut positions to provide a board.

DETAILED DESCRIPTION OF THE INVENTION

The invention will be explained with reference to the attached non-limiting drawings.

Figure 1:
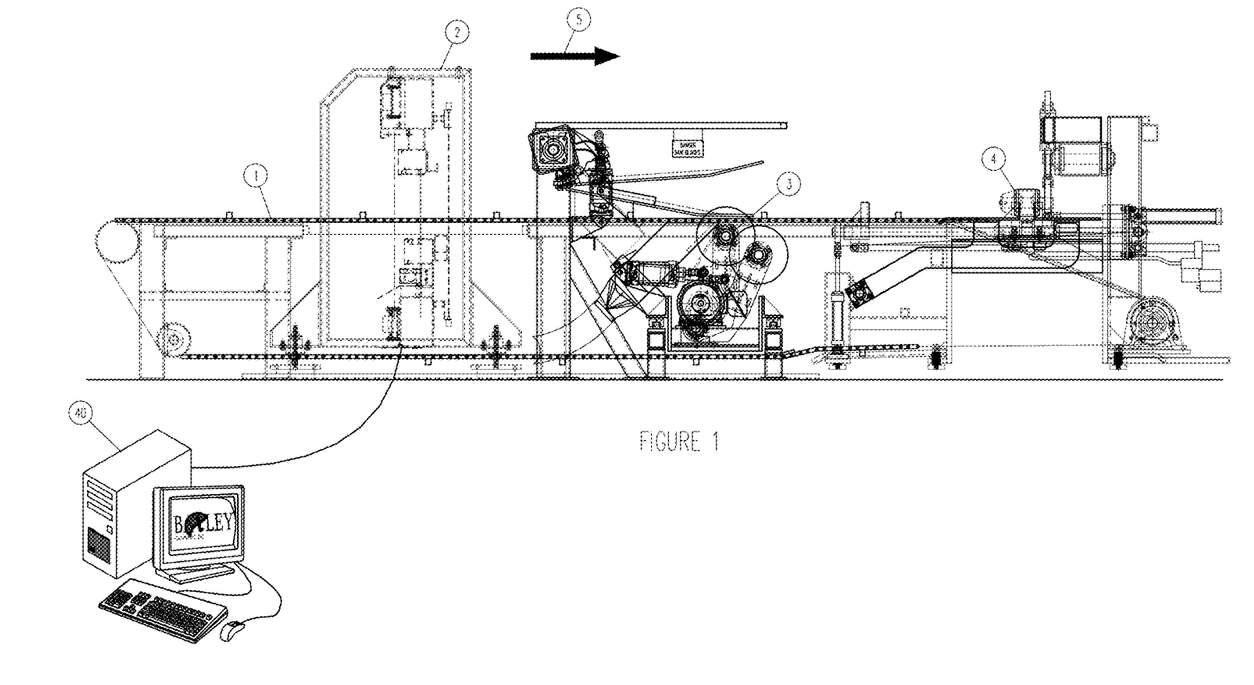
FIG. 1 shows a view of an Edger Cross Cut System.
Figure 2:
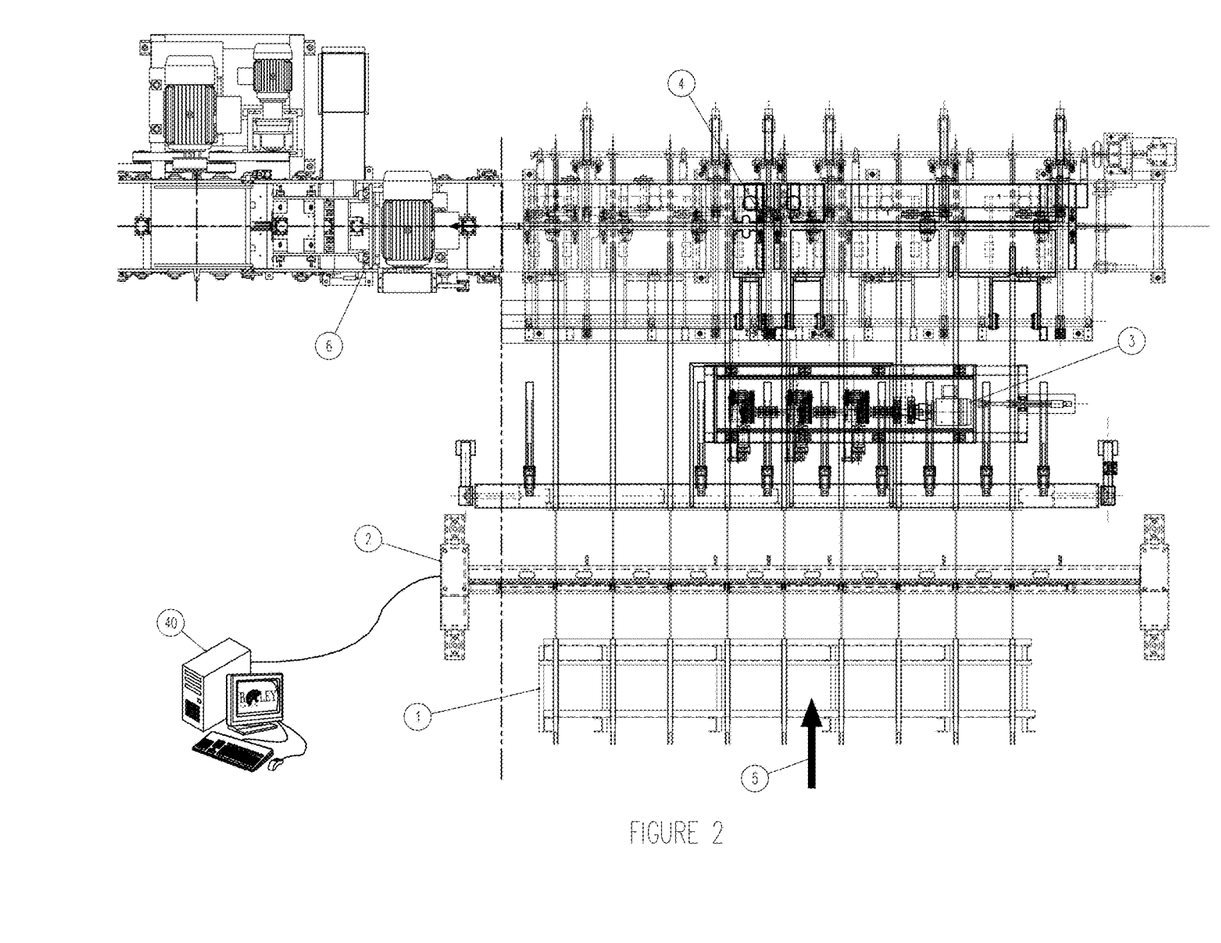
FIG. 2 shows a view of a cross cut edger system with the same elements as FIG. 1.

FIGS. 1 and 2 show an elevation view of an edger system having a conveyor 1 for conveying the lumber (flitch) which comprises of a plurality of lugged chains. The system includes a scanner 2 for scanning dimensions of the lumber, which can comprise laser range finders that measure the differential thickness of the board as it passes through. The scanner 2 is connected to a computer system 40, which calculates theoretical edge positions.

The system shown in FIGS. 1 and 2 includes a conventional positioning system 4 constructed to position the lumber in relation to the edger saws 6. The conventional positioning system 4 can be replaced with an improved positioning system according to the present invention, a non-limiting example of which is shown in FIGS. 4C-4D.

Figure 4A:
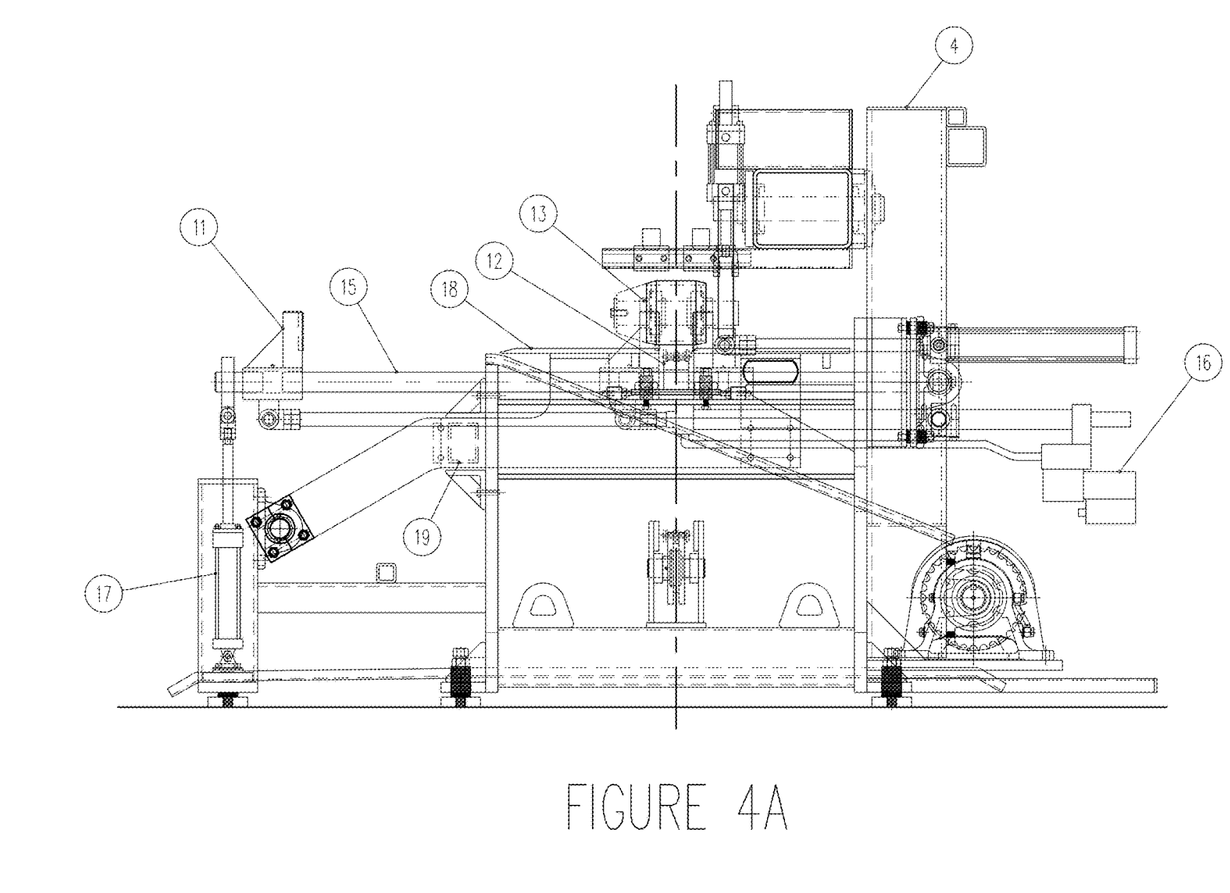
FIGS. 4A-4D show a board positioning system.
Figure 4B:
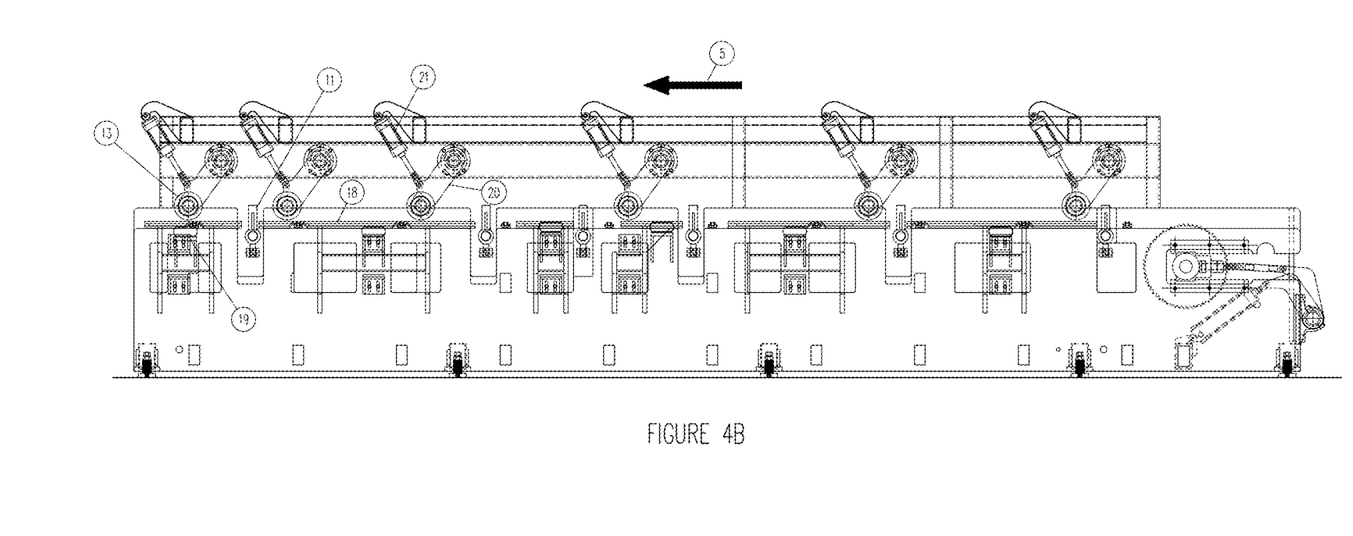
Figures 4C, 4D:
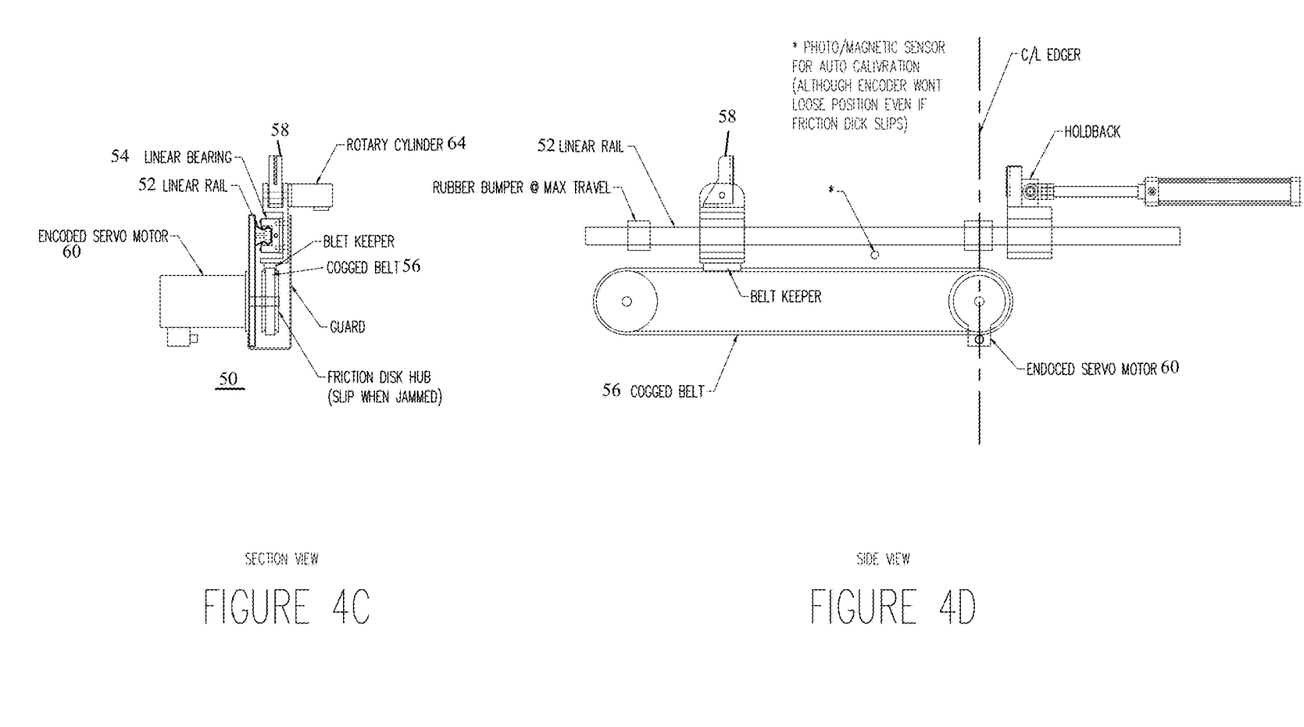
Figure 5:
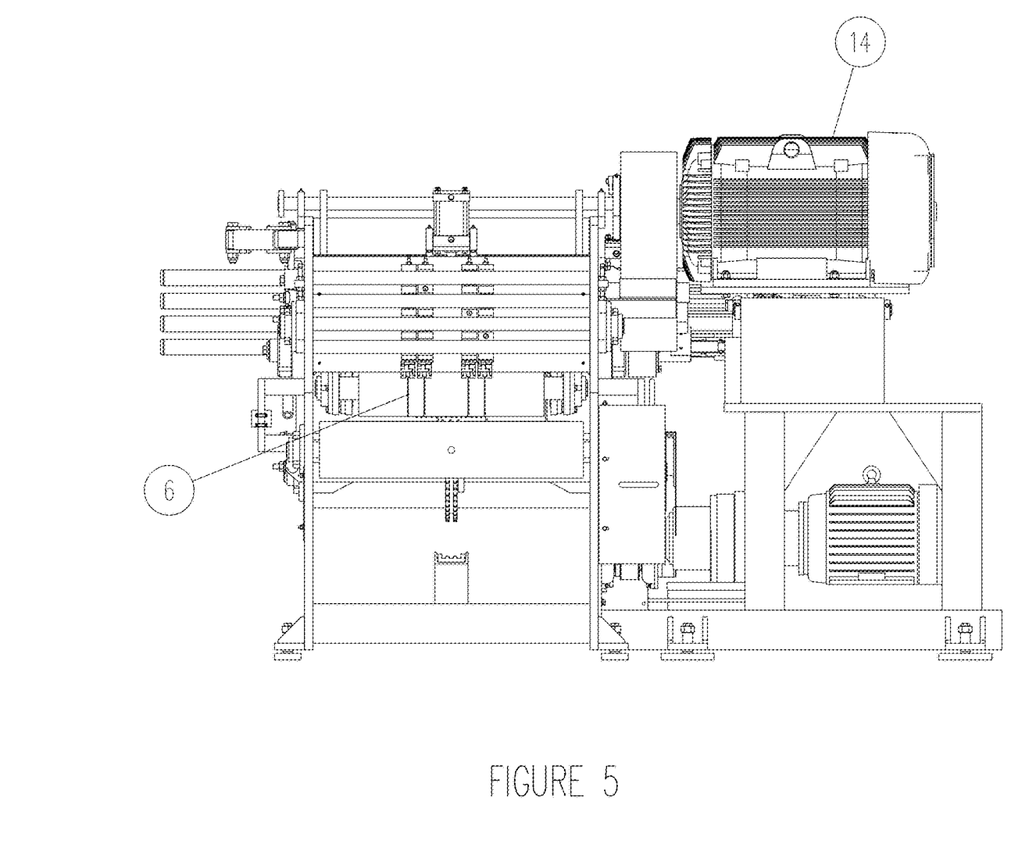
FIG. 5 shows edger saws.

The improved positioning system 50 shown in FIGS. 4C-4D can comprise a plurality of computer controlled moveable board positioning devices that can be mounted on a rail with linear bearings and driven in and out (from the edger feed table) with a cogged belt (or chain, or other). A rotating fetcher finger can be located on each device that would rotate up depending on which fetcher was to be used. The servo motor can drive the device in and out and encoders (on the back of the servo drive and on the cogged belt sheave) can feed back the position to the control system. The selected fingers position the boards simultaneously in both the transverse direction and skewed direction relative to the edger saws 6. The individual boards are then conveyed through the edger saws sawing the desired boards. The lumber flows in direction 5.

Figure 3:
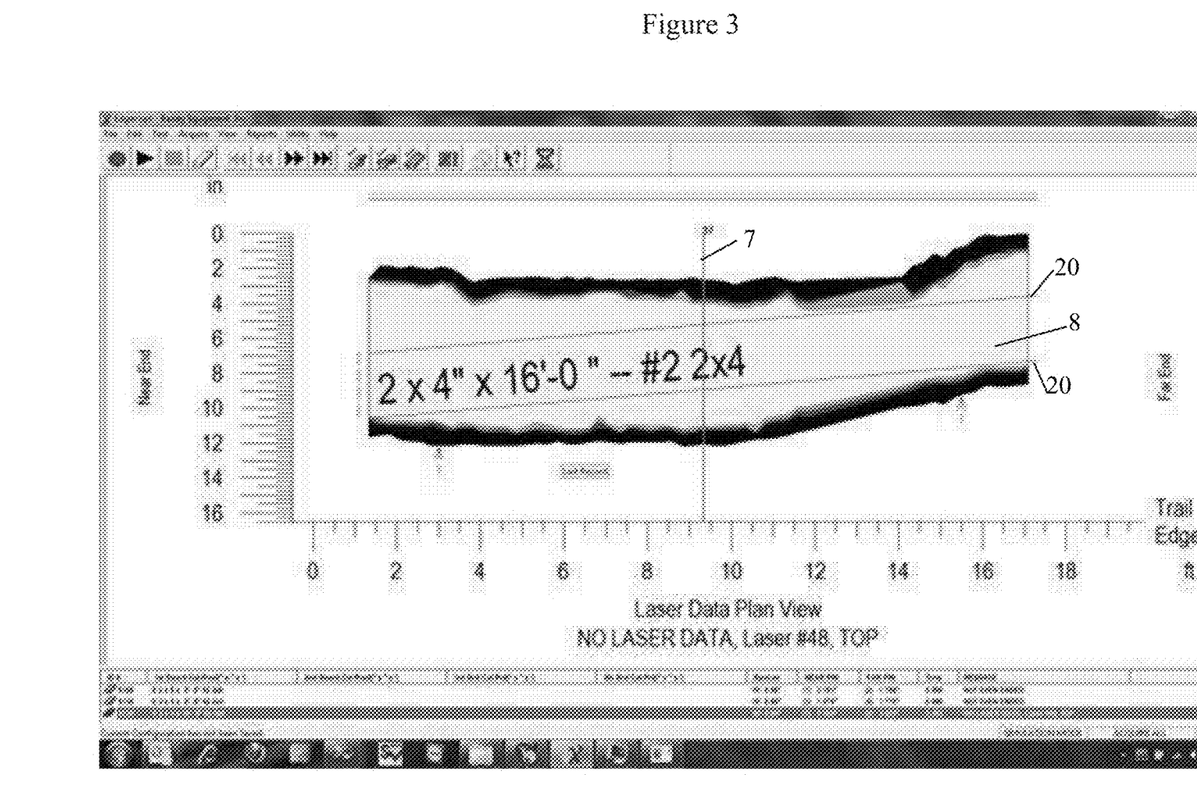
FIG. 3 shows a scanned plan view of a flitch having theoretical edge positions.

Lumber edger systems are now well known in the art. Examples of lumber edgers and scanning structures are disclosed in U.S. Pat. Nos. 6,308,756; 4,803,371; 4,676,130; and 4,462,443, the complete disclosures of which are incorporated herein by reference. Conventional lumber edger systems are capable of scanning the dimensions of a single piece of lumber and cutting the edges 20 of the piece of lumber as shown in FIG. 3. These conventional lumber edger systems can now be modified according to the present invention by incorporating an improved positioning device as described herein.

The non-edged lumber (also referred to as flitch) shown in FIG. 3 has a theoretical edge cuts 20 to provide board 8, which conventional edges are capable of cutting.

FIGS. 4A and 4B show a prior art positioning system 4 including positioning pins 11 to propel the flitch into position (translation and skew). Positioning pins 11 slide on a round way 15 moved by an actuator 16. The round way 15 is lowered by an actuator 17 to allow an incoming flitch to pass and raised to enable the positioning pin 11, to engage and pull the flitch into the desired position calculated by the computer system 40. Lumber parking ramps 18, raised by an actuator 19 allow the positioning pins 11 to pull the flitch across the conveyor feeding flitches through the saw 12. Once the flitch is in position the press rolls 13 are lowered by pivot arms 20 with actuators 21 stabilizing the flitch while the positioning pins 11 are retracted and parking ramps 18 are lowered releasing the flitch to be conveyed to the edger saws 6. The press rolls 13 push the flitch down so that the chain moves the flitch. The actuators can be controlled by the computer system 40.

FIGS. 4C and 4D show an example of an improved board positioning system. The positioning system comprises a plurality of computer controlled moveable board positioning devices 50 that can be mounted on a rail 52 with linear bearings and driven in and out (i.e. perpendicular to the flow of the lumber on the conveyor) with a cogged belt 56. The cogged belt can be replaced with a chain or other suitable device. The position device 50 is preferably driven by a non-hydraulic means. The belt 56 moves the device 50 in a direction perpendicular to the conveyor. A rotating fetcher finger 58 can be located on each device 50 that can rotate up into a contact position using the rotary cylinder 64 depending on which fetcher finger 58 is to be used and the finger 58 can be rotated down to move into a non-contact position out the way of the next flitch. The rotary cylinder 64 and motor 60 are connected to the computer 40. Usually 2 or more devices 50 and associated fetcher fingers 58 work together to rotate or skew the flitch or board with a fetcher finger 58 at each end of the board. The servo motor 60 can drive the device 50 in and out and encoders (on the back of the servo drive and on the cogged belt sheave) can feed back the position to the control system 40. When a board is to be rotated, the fetcher fingers 58 rotate up into the contact position and contact the board. The selected fingers 58 can be used to position the board simultaneously in both the transverse direction and skewed direction relative to the edger saws 6. Once the board is in position the press rolls 13 are lowered by pivot arms 20 with actuators 21 stabilizing the board while the fetchers 58 are retracted (rotated down into the non-contact position) and parking ramps 18 are lowered releasing the flitch to be conveyed to the edger saws 6. The press rolls 13 push the flitch down so that the chain moves the flitch. The individual boards are then conveyed on the conveyor through the edger saws sawing the desired boards. The lumber flows in direction 5. FIG. 8 shows the edger saws 6 driven by motor 14. The improved positioning device can be incorporated into conventional edger machines.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

We claim:

1. A lumber edger comprising:
a conveyor for conveying lumber;
a scanner for scanning dimensions of the lumber;
a computer in communication with the scanner;
edger saws constructed to edge the lumber; and
a positioning system constructed to position the lumber in relation to the edger saws, the positioning system comprising a plurality of positioning devices connected to the computer, each positioning device comprising a fetcher finger constructed to move between a contact position and a non-contact position, and move laterally in a direction substantially perpendicular to the conveyor using a non-hydraulic means, wherein the non-hydraulic means comprises a belt and an encoded servo motor connected to the computer, wherein at least two positioning devices are constructed to operate independently so that a first fetcher finger and a second fetcher finger can move laterally in the direction substantially perpendicular to the to contact the lumber and skew the lumber on the conveyor in relation to the edger saws.

2. A method of edge cutting lumber comprising:

conveying lumber on a conveyor;

scanning dimensions of the lumber using a scanner and sending the dimensions to a computer system;

using the computer system to determine theoretical edge cut positions on the lumber;

providing a positioning system constructed to position the lumber in relation to edger saws so that the edge saws cut the lumber at the theoretical edge cut positions, wherein the positioning system comprising a plurality of positioning devices connected to the computer, each positioning device comprising a fetcher finger constructed to move between a contact position and a non-contact position, and move laterally in a direction substantially perpendicular to the conveyor using a non-hydraulic means, wherein the non-hydraulic means comprises a belt and an encoded servo motor connected to the computer, at least two positioning devices being independently controlled by the computer system, the at least two positioning devices comprising a first positioning device comprising a first fetcher finger and a second positioning device comprising a second fetcher finger;

moving the first and second fetcher fingers into the contact position;

laterally moving the first and second fetcher fingers so that the first and second fetcher fingers contact the lumber and skew the lumber to line up the theoretical edge cut positions with edger saws; and cutting the lumber using the edger saws at the theoretical edge cut positions to provide a board.

3. The lumber edger according to claim 1, wherein the positioning system is constructed to simultaneously position the lumber on the conveyor in both a transverse direction and skew direction on the conveyor in relation to the edger saws.

4. The method according to claim 2, further comprising laterally moving the fetcher fingers in the contact position to simultaneously position the lumber in both the skew direction and a transverse direction on the conveyor to line up the theoretical cut lines with the edger saws.

5. The method according to claim 2, wherein the fetcher finger is constructed to rotate between a contact position and a non-contact position and the method further comprising rotating the first and second fetcher fingers into the contact position.

6. The lumber edger according to claim 1, wherein the fetcher finger is constructed to rotate between a contact position and a non-contact position.

* * * * *